United States Patent
Horie (10) Patent No.: US 9,244,508 B2
(45) Date of Patent: Jan. 26, 2016

(54) TEMPORARILY SWITCHING AN ELECTRONIC DEVICE TO BATTERY POWER TO HANDLE INRUSH UPON CONNECTION OF AN EXTERNAL DEVICE

(71) Applicant: Panasonic Corporation, Osaka (JP)

(72) Inventor: Satoshi Horie, Hyogo (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 403 days.

(21) Appl. No.: 13/747,569

(22) Filed: Jan. 23, 2013

(65) Prior Publication Data
US 2013/0198536 A1    Aug. 1, 2013

(30) Foreign Application Priority Data
Jan. 27, 2012   (JP) ................ 2012-015188

(51) Int. Cl.
G06F 1/26 (2006.01)
G06F 1/30 (2006.01)

(52) U.S. Cl.
CPC ............ *G06F 1/263* (2013.01); *G06F 1/266* (2013.01); *G06F 1/30* (2013.01)

(58) Field of Classification Search
CPC ............ G06F 1/263; G06F 1/266; G06F 1/30
See application file for complete search history.

(56) References Cited

U.S. PATENT DOCUMENTS

| | | | | |
|---|---|---|---|---|
| 7,340,627 B1* | 3/2008 | Harvey | ............ | 713/330 |
| 2006/0282691 A1* | 12/2006 | Barthe et al. | ............ | 713/300 |
| 2007/0278860 A1* | 12/2007 | Krieger et al. | ............ | 307/64 |
| 2008/0209237 A1* | 8/2008 | Kim | ............ | 713/300 |
| 2011/0109161 A1* | 5/2011 | Morishima | ............ | 307/66 |
| 2011/0218384 A1* | 9/2011 | Bachman et al. | ............ | 600/16 |

FOREIGN PATENT DOCUMENTS

| | | |
|---|---|---|
| JP | 1-047231 | 2/1989 |
| JP | 2004-029893 | 1/2004 |
| JP | 2004-094821 | 3/2004 |
| JP | 2007-160679 | 6/2007 |

* cited by examiner

*Primary Examiner* — Thomas Lee
*Assistant Examiner* — Danny Chan
(74) *Attorney, Agent, or Firm* — Panasonic Patent Center (57) ABSTRACT

An electronic device includes a power input unit through which power from an external power source can be input, a battery connector that is electrically connectable to a battery, a device connector that is electrically connectable to a removable external device, and a power controller that controls supply of power to the external device from the external power source and the battery. When the external device is connected to the connector, the power controller stops supplying power from the power input unit and supplies power from the battery to the external device, before supplying power from the external power source to the external device.

8 Claims, 5 Drawing Sheets

TEMPORARILY SWITCHING AN ELECTRONIC DEVICE TO BATTERY POWER TO HANDLE INRUSH UPON CONNECTION OF AN EXTERNAL DEVICE

BACKGROUND

1. Technical Field

The present disclosure relates to an electronic device capable of charging an internal battery and having power supplied from an external source, and more particularly to an electronic device that can be connected to an external device.

2. Related Art

Electronic devices that can operate using power supplied from an internal battery typically turn the power off when the battery becomes discharged and the output voltage drops in order to prevent faulty operation. In such electronic devices, a rush current is produced when the power turns on. A problem that can occur when this happens is that the rush current causes a temporary drop in the supply voltage, and this drop in the supply voltage causes the power to turn off. To prevent the power from turning off due to the rush current produced when the power turns on, JP-A-H01-047231 discloses technology that ignores this drop in the supply voltage when the power turns on.

In electronic devices that can receive power from an external source and can recharge an internal battery, power supply capacity of the connected external source may be unknown. If a current supply exceeding the power supply capacity of the external power source is received from such an external power source, the output voltage of the external power supply drops. A method for preventing faulty operation or failure of the electronic device when this happens is to monitor the output voltage of the external power supply and control the upper limit of the current supplied from the external power supply to prevent a drop in the output voltage of the external power supply. For example, when the electronic device detects a drop in the output voltage of the external power supply, the electronic device lowers the upper current limit from the present level, thereby preventing the output voltage from dropping and protecting the electronic device.

However, the conventional electronic device described above has a problem that if the rush current is high while an external device is connected, the capacity of the external power supply cannot be used effectively.

For example, when a specific memory card is inserted into the electronic device and the rush current to the memory card is high, current exceeding the normal current consumption of the electronic device flows for a certain time even if the memory card is normal. When this happens, the conventional electronic device detects a drop in the output voltage of the external power supply and lowers the maximum current limit. Depending on the actual external power supply capacity and the threshold level of the input current limit, unnecessary protection may thus be applied. As a result, only current up to the reduced limit is supplied, and it takes more time to charge the battery, so that effectively using the capacity of the external power supply may not be possible.

SUMMARY

The present disclosure provides an electronic device that can effectively utilize the supply capacity of the external power supply.

An electronic device according to the present disclosure includes a power input unit through which power from an external power source can be input, a battery connector that is electrically connectable to a battery, a device connector that is electrically connectable to a removable external device, and a power controller that controls supply of power to the external device from the external power source and the battery. When the external device is connected to the device connector, the power controller stops supply of power from the power input unit and supplies power from the battery to the external device, before supplying power from the external power source to the external device.

An electronic device according to the present disclosure eliminates the effect of rush current when it is connected to an external device while power is supplied from an external power supply, and effectively utilizes the supply capacity of the external power supply.

DETAILED DESCRIPTION OF EMBODIMENTS

Embodiments are described below with reference to the accompanying drawings. Note that unnecessarily detailed descriptions may be omitted. For example, detailed description of content that is already well-known, and redundant description of substantially identical elements, may be omitted or simplified to avoid unnecessary redundancy, and to simplify understanding by those skilled in the related art. The accompanying drawings and following description are provided by the inventor(s) to facilitate understanding by those skilled in the related art, and are not intended to limit the scope of the accompanying claims.

Embodiment 1

According to a first embodiment, when an electronic device is connected to an external device while power is being supplied to the electronic device from an external power supply, the electronic device detects connection of the external device and temporarily stops supply of power from the external power supply while a rush current is flowing to the external device. As a result, the electronic device prevents a drop in the voltage of the external power supply caused by the rush current occurring when the external device is connected. The configuration and operation of an electronic device according to this embodiment are described below.

1. Configuration of Electronic Device

Figure 1:
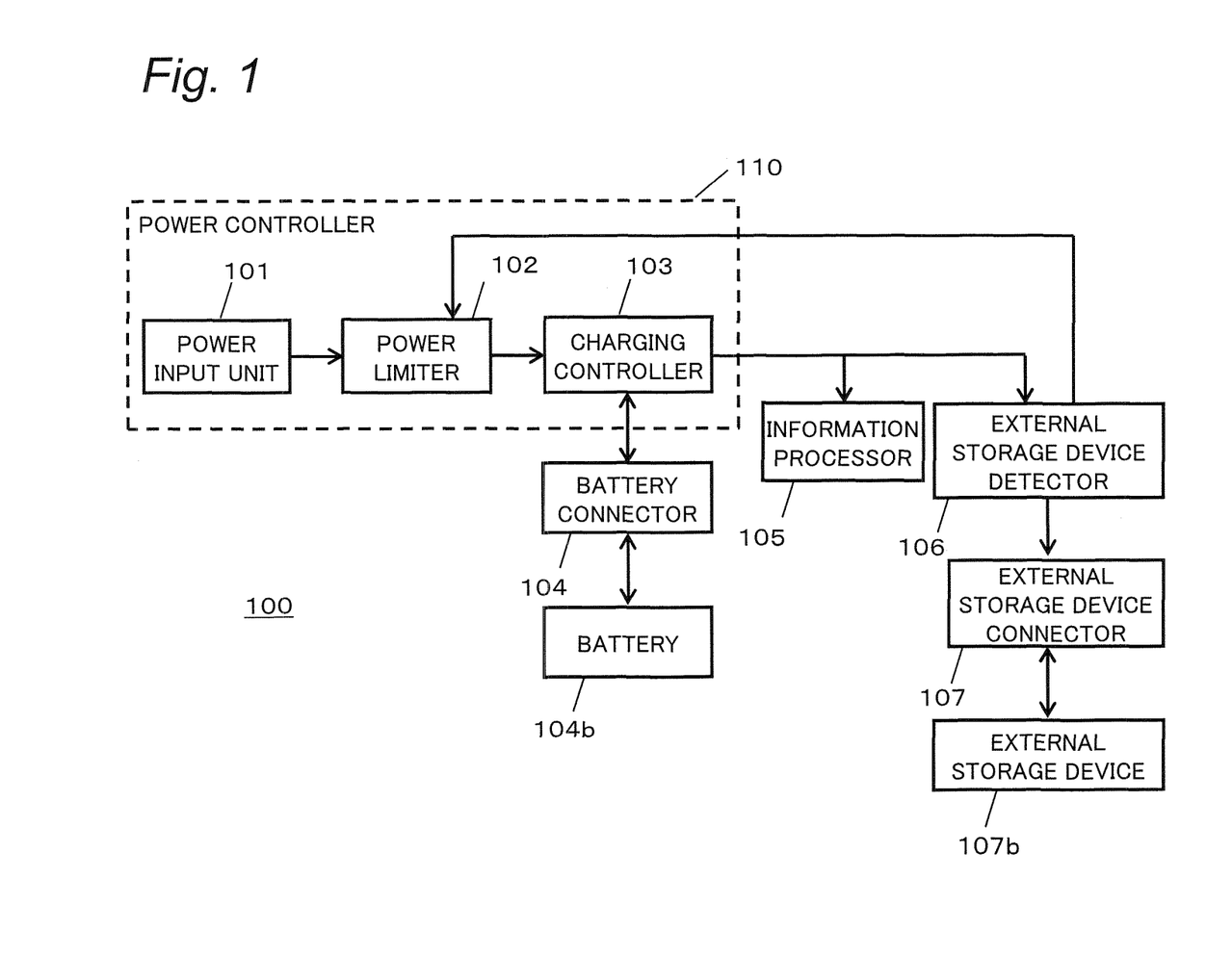
FIG. 1 is a block diagram showing the configuration of an electronic device according to Embodiment 1.

The configuration of the electronic device is described below with reference to FIG. 1. FIG. 1 is a block diagram showing the configuration of the electronic device. The electronic device 100 has a power input unit 101, a power limiter 102, a charging controller 103, a battery connector 104, an information processor 105, an external storage device detector 106, and an external storage device connector 107.

The power input unit 101 can be a terminal through which power is supplied from an external power source. The power input unit 101 may be a dedicated DC jack, a general-purpose DC jack, or a USB connection terminal.

The external storage device connector 107 connects to an external storage device 107b (one example of an external device) such as a memory card, and reads data recorded in the external storage device 107b and writes data processed by the information processor 105 to the external storage device 107b. The external storage device connector 107 is a card slot that accepts memory cards, for example.

The external storage device detector 106 electrically or mechanically detects connection of an external storage device to the external storage device connector 107, and outputs a detection signal.

The power limiter 102 controls supplying and temporarily stopping supply of power from the power input unit 101 to the charging controller 103 and downstream units based on the detection result from the external storage device detector 106. Downstream units include, for example, portions electrically connected to the power controller 110.

The charging controller 103 controls charging a battery 104b. More specifically, the charging controller 103 supplies power from the power input unit 101 to the battery 104b connected to the battery connector 104 to charge the battery 104b. The charging controller 103 also supplies power of a specific voltage to the information processor 105, external storage device detector 106, and external storage device connector 107. At this time, the charging controller 103 controls switching the source of the power supply to the charging controller 103 and downstream units between the external power source and the battery 104b. The charging controller 103 can thus output two different voltages, that is, a voltage for charging the battery 104b and a voltage for driving the information processor 105 and other units.

It is possible to determine that a current exceeding the capacity of the external power source is being supplied to the charging controller 103 when the voltage of the external power source drops below a specific threshold. In view of this, the charging controller 103 monitors the voltage of the external power source, and controls lowering the maximum input current limit in steps, when the voltage of the external power source goes below the specific threshold. The charging controller 103 is a charging control IC, for example. The charging controller 103 as well as power input unit 101 and power limiter 102 constitute a power controller 110 that controls the power supply to the external device. The entire power controller 110 may be formed by a single charging control IC.

The information processor 105 includes a CPU, for example, and executes a specific program by the CPU to provide processing to achieve main functions of the electronic device. The information processor 105 may be constructed to render those functions using only hardware.

The external storage device 107b such as a memory card is an example of external device. The external storage device connector 107 is an example of a device connector. The external storage device detector 106 is an example of a detector. The power limiter 102 is an example of a power controller.

2. Operation

Figure 2:
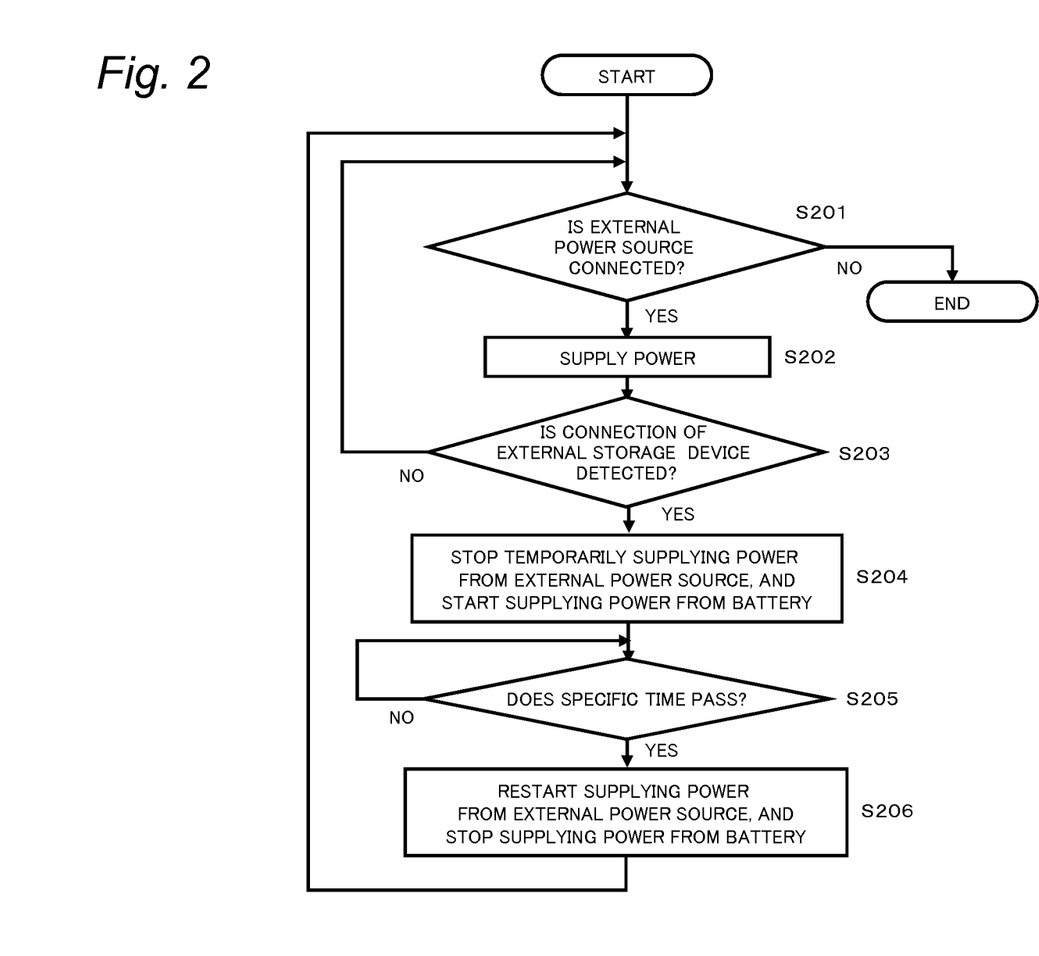
FIG. 2 is a flow chart of the operation of an electronic device according to Embodiment 1.

FIG. 2 is a flow chart describing operation when an external power source is connected to the electronic device 100. Note that a memory card is used below as an example of an external storage device 107b.

Connection of an external power source is checked while an external power source is connected to the power input unit 101 of the electronic device 100 (step S201), and if disconnection of the external power source is detected (step S201 returns NO), this process ends.

However, when the external power source remains connected (step S201 returns YES), power is supplied from the external power source through the charging controller 103 to the information processor 105, external storage device detector 106, and external storage device connector 107 (step S202). The battery 104b connected to the battery connector 104 could be charged or not charged at this time. When a memory card 107b is then connected to the external storage device connector 107, the external storage device detector 106 detects insertion of the external storage device 107b (step S203 returns YES). The external storage device detector 106 then sends memory card detection data to the power limiter 102. Based on this detection data, the power limiter 102 temporarily stops supplying power from the external power source to the downstream processing units (step S204). At this time the charging controller 103 switches the power supply so as to supply power to the information processor 105, external storage device detector 106, and external storage device connector 107 from the battery 104b connected to the battery connector 104. A rush current, which is a strong current relative to the normal load of the electronic device 100, flows from the battery 104b to the memory card 107b at this time. However, in this embodiment, the power supply from the external power source to the memory card 107b is stopped by the power limiter 102 while the rush current is flowing, thus the voltage of the external power source is not affected by the rush current, and a drop in the voltage of the external power source can be prevented.

The power limiter 102 then checks if a specific time has passed from the stop of the power supply (step S205). This specific time is preset in the power limiter 102 to a time that is long enough for the rush current flow to the memory card 107b to stop. Current consumption differs, and the time required for the rush current to stop flowing differs, according to the type of memory card connected to the electronic device 100. This specific time is therefore set to a time sufficient for the rush current to stop flowing for any memory card expected to be connected to the electronic device 100.

Step S205 repeats until this specific time passes (step S205 returns NO). When the power limiter 102 detects this specific time has passed (step S205 returns YES), the power limiter 102 resumes supplying power from the external power source to the downstream processing units (step S206). At this time the charging controller 103 also switches the source of the power supplied to the information processor 105 and other downstream processing units, from the battery 104b to the external power source. Control then returns to step S201, and the above process repeats.

As described above, according to this embodiment, when connection of the memory card 107b to the external storage device connector 107 is detected while power is being supplied from the external power source to the processing units downstream from the charging controller 103, the rush current flowing to the memory card 107b connected to the external storage device connector 107 is supplied from the battery 104b. As a result, even if the memory card 107b is connected to the external storage device connector 107 while power is being supplied from the external power source to the processing units downstream from the charging controller 103, excessive current flowing from the external power source can be avoided.

When the process described above is not executed, the rush current will be supplied from the external power source to the memory card 107b when the memory card 107b is connected to the external storage device connector 107. At this time, if a maximum limit of an input current to the charging controller 103 is greater than the capacity of the external power source, a current exceeding the capacity of the external power source will be supplied from the external power source. As a result, the voltage of the external power source drops, and the charging controller 103 will determine that the current is supplied excessively at the current maximum limit of the input current and therefore reduce the maximum limit.

An example applying power control as described above during USB charging is described below with reference to the following specific conditions.

Supply capacity of the external power source is 5V, 800 mA (4.0 W)

Maximum power consumption of the charging controller 103 and downstream processing units of the electronic device 100 when power is supplied from the external power source is 3.5 W.

The charging controller 103 reduces the maximum limit of the input current in steps as follows at 5 V: 1.5A−>900 mA−>500 mA−>100 mA.

If the memory card 107b is not connected to the external storage device connector 107, the power consumption of the electronic device 100 is low relative to the supply capacity of the external power source, and therefore the charging controller 103 does not apply control reducing the maximum limit of the input current. As a result, all power required for operation of the electronic device 100 can be supplied from the external power source.

However, in cases where the process of this embodiment described above is not executed when the memory card 107b is connected to the external storage device connector 107, power equal to the normal power consumption of the electronic device 100 plus the rush current to the memory card 107b will be temporarily supplied from the external power source to the electronic device 100. When this happens, a voltage drop occurs in the external power source at the time power exceeding the actual supply capacity of the external power source is supplied. As a result, the charging controller 103 lowers the maximum limit of the input current until the voltage of the external power source stops dropping, and the maximum limit eventually goes to 500 mA (a level below the 800 mA which is the supply capacity of the external power source). More specifically, unlike before the memory card 107b is connected, full power cannot be supplied from the external power source to the electronic device 100 after the rush current stops flowing to the memory card 107b, so that the capacity of the external power source cannot be used effectively.

Therefore, the configuration of the embodiment described above prevents the rush current from flowing from the external power source to the memory card 107b when the memory card 107b is connected, thereby preventing the charging controller 103 from unintentionally lowering the maximum limit of the input current due to connection of the memory card 107b. As a result, the capacity of the external power source can be effectively utilized.

As described above, the electronic device 100 according to this embodiment includes the power input unit 101 capable of inputting power supplied from the external power source, the battery connector 104 that can electrically connect the battery 104b, the external storage device connector 107 (such as a card slot) that can electrically connect the removable external device 107b (such as a memory card), and the power controller 110 that can control the power supply to the external device 107b from either one of the external power source and the battery 104b. When the external device 107b is connected to the external storage device connector 107, the power controller 110 stops the power supply from the power input unit 101 to the external storage device connector 107 before supplying power from the external power source to the external device 107b, and supplies power from the battery 104b to the external device 107b.

As a result of this configuration, when the external device 107b is connected to the electronic device 100, supply of power from the external power source to the external device 107b starts after the rush current flowing in the external device 107b ends. A voltage drop in the external power source caused by the rush current flowing in the external device 107b can therefore be prevented when the external device 107b is connected to the electronic device 100. More specifically, the electronic device according to this embodiment can prevent the problems caused by a voltage drop in the external power source resulting from the rush current that flows when the external device 107b is connected to the electronic device 100.

3. Other Embodiments

The above embodiment is described above as an example of the technology disclosed herein. However, the technology in this disclosure is not limited thereto, and can also be applied to other embodiments including desirable changes, substitutions, additions, or subtractions. Other embodiments are also possible by combining elements of the first embodiment described above in other ways. Examples of other embodiments are described below.

The power limiter 102 and charging controller 103 are described in the foregoing embodiment as having the function and configuration described above. However configurations in which part of the function and configuration of one processing unit is contained in another processing unit are also conceivable.

The charging controller 103 and information processor 105 are described in the foregoing embodiment as having the function and configuration described above. However configurations in which part of the function and configuration of one processing unit is contained in another processing unit are also conceivable.

Figure 3:
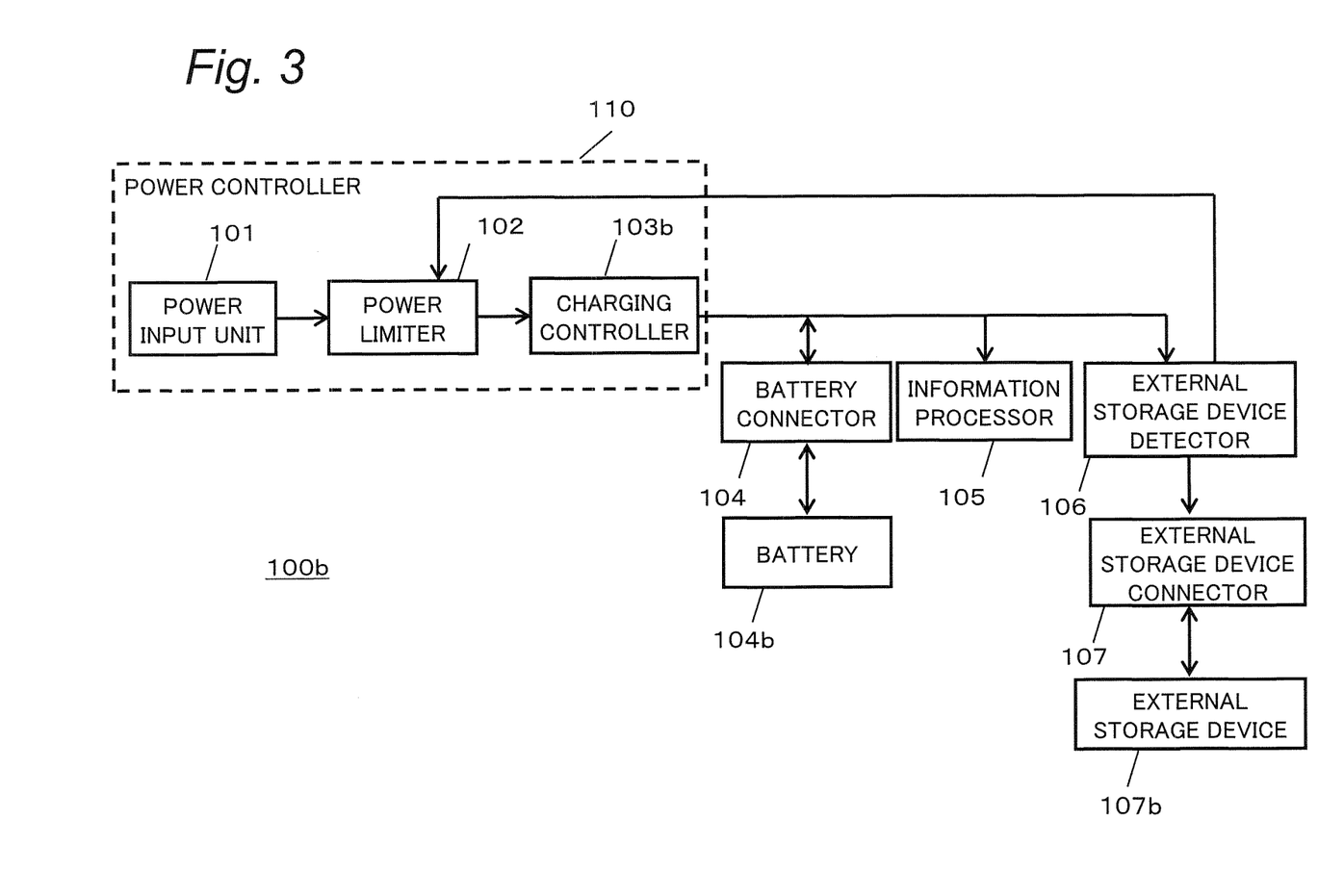
FIG. 3 is a block diagram showing the configuration of an electronic device according to another embodiment.

In the foregoing embodiment (the configuration shown in FIG. 1), the charging controller 103 can output two different voltages (a voltage for charging the battery 104b, and a voltage for driving the information processor 105 and other processing units). When the charging controller can only output one voltage, the battery connector 104 may be connected to a charging controller 103b as shown in FIG. 3. When configured as shown in FIG. 3, the battery 104b is charged through the charging controller 103b connected to the battery connector 104 at the same time power is supplied from the external power source to the information processor 105.

Figure 4:
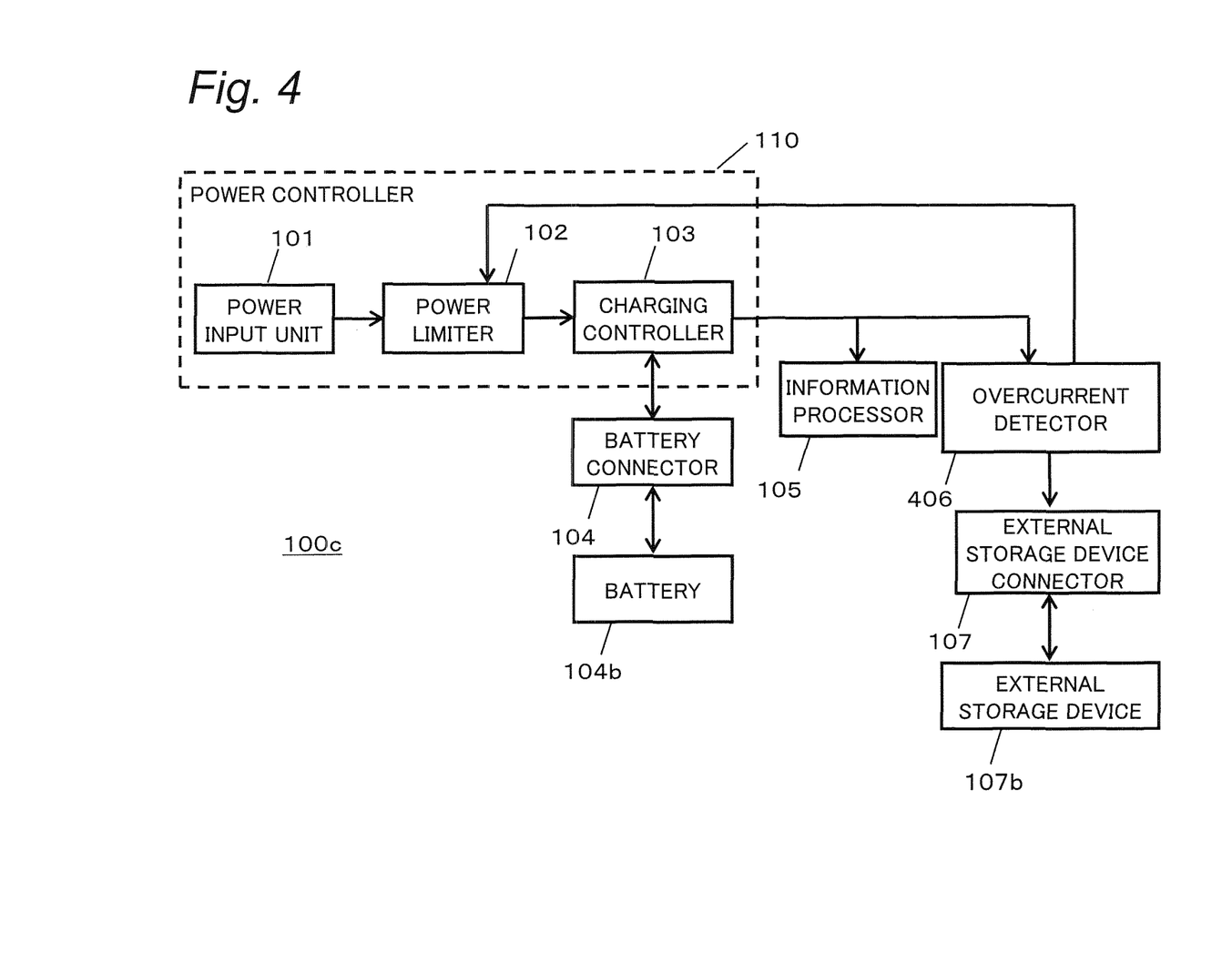
FIG. 4 is a block diagram showing the configuration of an electronic device according to another embodiment.

In the foregoing embodiment, the external storage device detector 106 that physically detects connection of a memory card is described as detecting the rush current in the memory card. Instead, an overcurrent detector 406 (an example of a rush current detector) that detects current flow to the external storage device 107b could be provided as shown in FIG. 4. A configuration that detects a rush current to the memory card with the overcurrent detector 406, and power supply from the external power source is stopped temporarily until a specific time passes is also conceivable.

A storage device such as a memory card is described as an example of an external device in the foregoing embodiment, but the external device is not so limited and could be another type of removable device. For example, the external device could be a wireless module or a GPS module. The external device could also be an accessory that is attached to a digital camera, such as an electronic viewfinder or a flash device.

In the foregoing embodiment, the timing for switching the power supply is determined by detecting connection of the external device 107b such as, for example, a memory card. However, instead of controlling the switching of the power supply based upon the time of connection of an external device (memory card) as in the foregoing embodiment, the switching of the power supply could be controlled based on any timing of some other operation that produces a rush current. For example, the rush current occurs when the power supply to the memory card starts (turns on), and not immediately after the memory card is simply physically connected. Switching the power supply can therefore be controlled according to the timing when power is actually supplied to the memory card.

Figure 5:
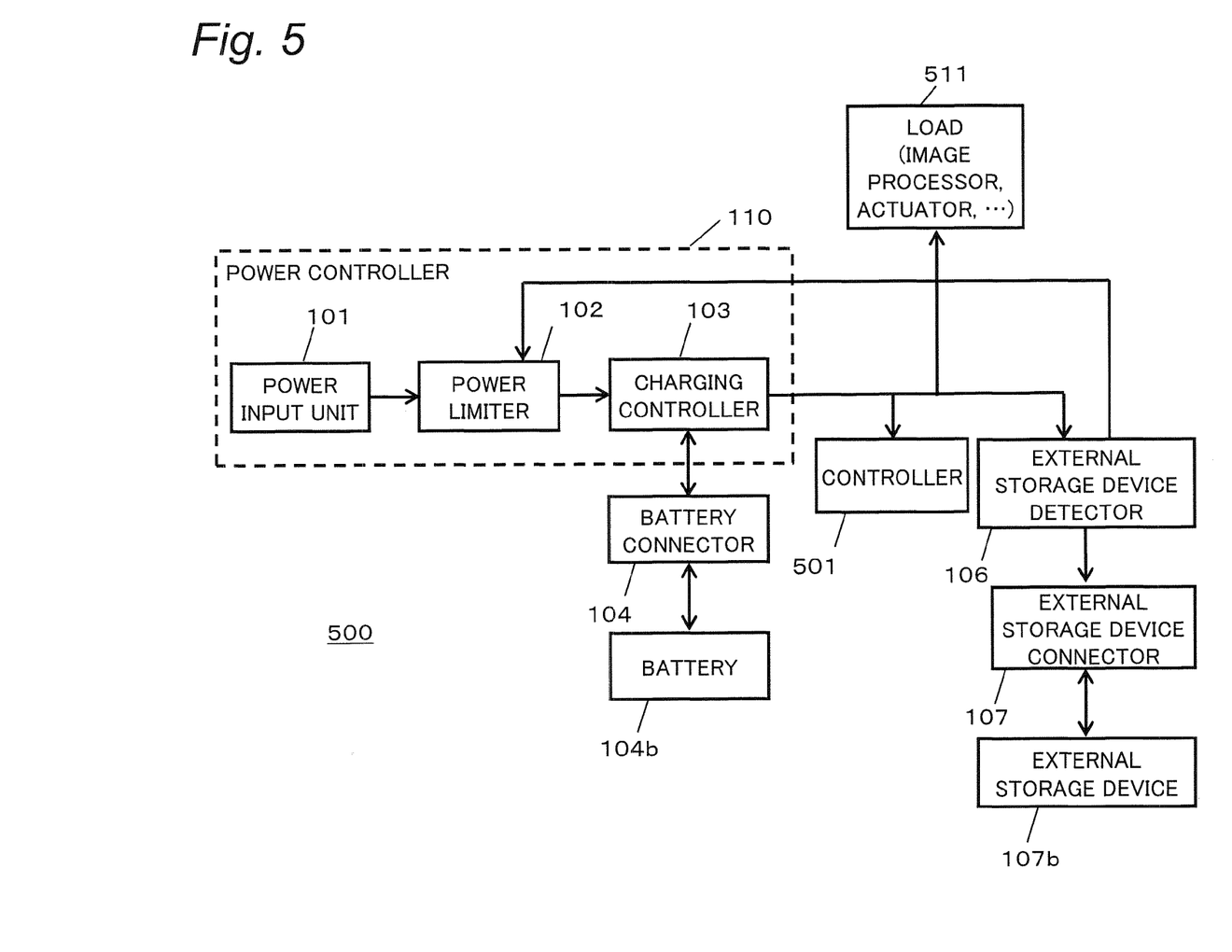
FIG. 5 shows the configuration of an imaging apparatus which is applied the concept of power supply control disclosed in Embodiment 1.

The concept of power supply control described in the foregoing embodiment can also be applied to a variety of electronic devices. Examples include digital cameras, movie cameras, smartphones, and other imaging apparatus with a function for capturing images. FIG. 5 shows the configuration of an exemplary imaging apparatus employing the configuration of the power supply control as shown in FIG. 1. The imaging apparatus 500 captures a subject image incident to an image sensor through an optical system, and generates an image signal. The generated image signal is processed by an image signal processor and recorded on a memory card 107b. FIG. 5 shows only the configuration related to power supply control in the imaging apparatus, and does not show an optical system including lenses, the image sensor, and so on. The imaging apparatus 500 includes a controller 501 that controls operation of the imaging apparatus 500, and a load 511 other than the controller 501 that consumes power. The load 511 includes an image signal processor for processing the image signals generated by the image sensor, and circuits and components that consume power, including an actuator for driving the optical system, and so on. The information processor 105 shown in FIG. 1 corresponds to the controller 501. Power from the external power source or battery 104b is supplied to the controller 501 and load 511. An example of an imaging apparatus which is applied the power supply control configuration shown in FIG. 1 is described in FIG. 5, but the power supply control configurations shown in FIG. 3 and FIG. 4 can obviously also be applied to an image pickup device.

The foregoing embodiments are described as examples of the technology disclosed herein, and the accompanying drawings and detailed description are provided for this purpose.

The elements described in the accompanying drawings and detailed description therefore include, in addition to elements that are necessary to solve the problem described above, and elements that are not necessary to solve the foregoing problem but are useful for describing the technology. The elements that are not essential are described in the accompanying drawings and detailed description should therefore not be construed to mean that non-essential elements are essential.

The foregoing embodiments are for describing the technology disclosed by the present disclosure, and changes, substitutions, additions, and subtractions within the scope of the accompanying claims and the equivalent are possible.

INDUSTRIAL APPLICABILITY

The electronic device disclosed herein can effectively utilize the supply capacity of an external power source. The concept of the embodiment can therefore be usefully applied to electronic devices such as digital still cameras, movie cameras, and cell phones to which a memory card or other external device can be connected.

What is claimed is:

1. An electronic device comprising:
a power input unit through which power from an external power source can be input;
a battery connector that is electrically connectable to a battery;
a device connector that is electrically connectable to a removable external device; and
a power controller that controls supply of power to the external device from the external power source and the battery, wherein
the power controller is configured to reduce a maximum limit of an input current from the external power source when a voltage drop of the external power source occurs due to supplying of power from the external power source to the external device upon connection of the external device to the device connector, and
when the external device is connected to the device connector, the power controller always stops supplying power from the power input unit and supplies power from the battery to the external device, before supplying power from the external power source to the external device.

2. The electronic device according to claim 1, further comprising a detector that detects connection of the external device to the device connector;
wherein the power controller always stops supplying power from the power input unit to the connector when the detector detects connection of the external device to the connector.

3. The electronic device according to claim 2, wherein:
the power controller starts supplying power from the power input unit after a specific time passes from stopping supplying power to the external device from the power input unit.

4. The electronic device according to claim 1, further comprising a current detector that detects a rush current occurring when the external device is connected to the device connector;
wherein the power controller always stops supplying power from the power input unit when the current detector detects the rush current.

5. The electronic device according to claim 4, wherein:
after the power controller stops supplying power from the power input unit, the power controller starts supplying power from the power input unit to the external device after the current detector does not detect the rush current.

6. The electronic device according to claim 1, wherein the external device is a removable storage medium.

7. An imaging apparatus that captures a subject and generates image data, comprising:
a power input unit through which power from an external power source can be input;
a battery connector that is electrically connectable to a battery;
a device connector that is electrically connectable to a removable external device; and
a power controller that controls supplying power to the external device from the external power source and the battery, wherein
the power controller is configured to reduce a maximum limit of an input current from the external power source when a voltage drop of the external power source occurs due to supplying of power from the external power source to the external device upon connection of the external device to the device connector, and
when the external device is connected to the device connector, the power controller always stops supplying power from the power input unit and supplies power from the battery to the external device before supplying power from the external power source to the external device.

8. An electronic device comprising:
a power input unit through which power from an external power source can be input;
a battery connector that is electrically connectable to a battery;
a device connector that is electrically connectable to a removable external device; and
a power controller that controls supply of power to the external device from the external power source and the battery; and
a detector that detects a rush current occurring when the external device is connected to the device connector;
wherein the power controller is configured to reduce a maximum limit of an input current from the external power source when a voltage drop of the external power source occurs due to supplying of power from the external power source to the external device upon connection of the external device to the device connector; and
wherein the power controller always stops supplying power from the power input unit when the current detector detects the rush current and supplies power from the battery to the external device, and the power controller starts supplying power from the power input unit to the external device after the current detector does not detect the rush current.

* * * * *